2,751,343
Patented June 19, 1956

2,751,343

PRODUCTION OF α-KETOCARBOXYLIC ACID ESTERS

John B. Wright, Kalamazoo Township, Kalamazoo County, Mich., assignor to The Upjohn Company, Kalamazoo, Mich., a corporation of Michigan No Drawing. Application January 10, 1955,
Serial No. 481,017

9 Claims. (Cl. 204—158)

This invention relates to a novel process for the production of α-ketocarboxylic acid esters.

It is an object of the present invention to provide a process for the production of α-ketocarboxylic acid esters. Another object is the provision of a process for the production of alkyl esters, preferably lower-alkyl, of α-ketocarboxylic acids wherein, exclusive of the α-ketocarboxylic acid ester group, the compounds are hydrocarbon. Other objects will be apparent to those skilled in the art to which this invention pertains.

According to the present invention an aldehydic acetal of an α-ketoaldehyde, preferably a 1,1-dialkoxy-2-ketone, i. e., a dialkyl acetal of an α-ketoaldehyde, is reacted with an N-bromoimide, an N-bromoamide, an N-chloroimide or an N-chloroamide to produce an α-ketocarboxylic acid ester. This reaction, exemplified by the preferred dialkyl acetal compounds, may be illustrated as follows:

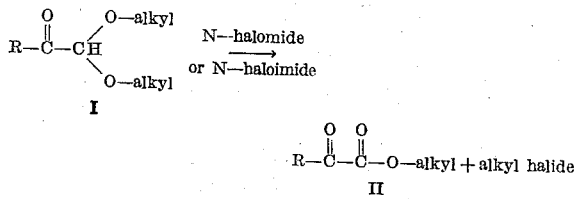

In the above formulae, R represents a monovalent carbon linked radical which constitutes the remainder of the carbonyl compound, which is preferably inert to the N-halo compound and is desirably hydrocarbon, and halo means chlorine or bromine.

In carrying out the process of the present invention, the starting aldehydic acetal of an α-ketoaldehyde is reacted, in the presence of an inert organic solvent, with an N-haloamide or imide wherein the halo group is a halogen having an atomic weight from 35 to 80, inclusive, i. e., chlorine or bromine.

The reaction solvent is preferably a halogenated hydrocarbon, since these solvents are ordinarily inert to the N-halogenated amides and imides employed in the process of the present invention. Included as solvents are ethylene dichloride, methylene chloride, perchloroethylene, chloroform, methylchloroform, carbon tetrachloride, propyl chloride, etc. Other substantially inert solvents which may be employed as reaction solvent include the saturated aliphatic hydrocarbons, e. g., pentane, hexane, heptane, octane, the aromatic hydrocarbons, e. g., benzene, etc. As would be expected in a halogenation reaction of this type, the nonhalogenated solvents may, under more vigorous conditions, be affected by the halogenating agent also.

Reaction temperatures may vary widely, e. g., from about zero to about 150 degrees centigrade, depending primarily upon the stability of the reactants, product and solvent at the higher temperatures and upon the solubility and reactivity of the reactants at the lower temperatures. Ordinarily, substantial reaction occurs at room temperature, in the presence of an efficient catalyst with the preferred reaction temperature range being between about 25 and about 100 degrees centigrade, e. g., to the boiling point of carbon tetrachloride.

The reaction of the present invention proceeds most rapidly, efficiently in the presence of a reaction catalyst. Catalysts commonly employed in halogenation reactions involving, for example, N-bromosuccinimide may ordinarily be employed, the most common and efficient being light, i. e., ultraviolet, visible and infra-red light between 1,000 and 10,000 Angstrom units, e. g., sun light. A drying heat lamp is a most convenient source of light, especially since infrared rays are generated by the lamp, as well as the visible rays. Thus the reaction can be warmed and catalyzed simultaneously.

Other catalysts which can be employed include the reasonably stable organic peroxides, e. g., dibenzoyl peroxide. The reaction will proceed in the absence of added catalyst, but the reaction ordinarily is catalyzed, preferably with light.

Reaction time is determined by the vigor of the reaction which, in turn, is determined by the starting acetalized α-ketoaldehyde, selected halogenating agent, reaction temperature, and catalyst. A most convenient manner of determining the progress of the reaction is by titration of aliquot portions of the reaction mixture for unreacted halogenating agent or continuing the reaction until the characteristic color disappears, if an excess of halogenating agent is not employed. Ordinarily, a few hours at about 75 degrees in the presence of a strong light catalyst is sufficient.

The ratio of halogenating agent to starting α-ketoaldehyde acetal is mole for mole, when the halogenating agent possesses but one halogenating halogen, and this ratio is ordinarily employed in the reaction. However, it is sometimes more expedient to employ an excess of halogenating agent and then, if desired, destroy the excess when about a molar equivalent has been consumed in the reaction, e. g., with aqueous sodium sulfite or ammonium chloride. In some instances the excess halogenating agent need not be destroyed, merely separated during purification of the reaction product. If other portions of the acetalized α-ketoaldehyde molecule are susceptible to halogenation or oxidation by the halogenating agent, the amount of halogenating agent consumed in this secondary reaction or reactions should be taken into account in determining the optimum amount of halogenating agent to employ.

The halogenating agents of the present invention are the N-haloamides and N-haloimides wherein the halo group is chlorine or bromine, most familiar and common of these being N-bromosuccinimide and N-bromoacetamide. Others are N-bromohydantoin and N-bromosubstitutedhydantoins, N-chlorosuccinimide, N-chloroacetamide and N-bromophthalimide, 3-bromo and 1,3-dibromo-5,5-dimethylhydantoin.

Starting acetalized α-ketoaldehydes of the present invention are, as stated before, the α-ketoaldehydes wherein the aldehyde group only is acetalized, i. e., aldehydic acetalized α-ketoaldehydes. Preferred among these are the dialkyl acetals of α-ketoaldehydes and preferably the di-lower-alkyl acetals, i. e., wherein each of the alkyl groups of the acetal group contains from one to eight carbon atoms, inclusive, preferably dimethyl or diethyl acetals of α-ketoaldehydes. The remainder of the α-ketoaldehyde acetal, exclusive of the ketoaldehyde acetal group, is preferably hydrocarbon, especially aromatic or saturated aliphatic or cycloaliphatic, e. g., wherein the hydrocarbon radical contains from one to twelve carbon atoms, inclusive.

If the starting α-ketoaldehyde acetal is a cyclic acetalized compound, e. g., an ethylene glycol acetal, a propylene glycol acetal or a trimethylene glycol acetal, i. e., the acetal of an alkane-α-diol or alkane-β-diol preferably containing from two to eight carbon atoms, inclusive, the reaction product will be a β- or γ-haloalkyl ester of an α-ketocarboxylic acid, e. g., a β-bromoethyl ester when the acetal is an ethylene glycol acetal or a γ-bromopropyl ester when the acetal is a trimethylene glycol acetal and the halogenating agent is, for example, N-bromosuccinimide.

When the acetal is the preferred dialkyl acetal, i. e., the starting compounds is a 1,1-dialkoxy-2-ketone, with the alkoxy groups each preferably containing from one to eight carbon atoms, inclusive, the reaction product is an alkyl ester of an α-keto-carboxylic acid (II). Ordinarily, the two alkoxy groups of the preferred starting compounds (I) are alike. If they are different, the reaction product may consist of a mixture of esters of an α-ketocarboxylic acid.

Included as starting compounds of the present invention are those dialkyl acetals of α-ketoaldehydes (I) wherein R is, for example, alkyl, e. g., lower-alkyl, aromatic hydrocarbon, e. g., phenyl, tolyl, xylyl, naphthyl, anthryl, cycloaliphatic, e. g., cyclopentyl, cyclohexyl, heterocyclic, e. g., 2-pyridyl, 2-thienyl, 2-pyranyl, 2-furyl, which may be additionally substituted with halogen, hydroxy, acyloxy, tosyloxy, sulfo, nitro, ketalized keto, carboalkoxy, etc., and other non-interfering groups. In some instances, these groups may also be altered during the reaction, e. g., a hydroxy oxidized to a keto group.

Aldehydic acetals of α-ketoaldehydes are a well known class of compounds and there are numerous methods known in the art for their preparation. See, for example, U. S. Patent 2,421,559, Torrey, et al., J. Org. Chem., 6, 289 (1941), and Wöhl and Lange, Ber., 41, 3615 (1908).

The products of the present invention, i. e., α-ketocarboxylic acid esters are a well known class of compounds. See, for example, Richter's Organic Chemistry, vol. I, 462; vol. III, 422, Third English Edition (1947), etc. Their uses are diversified and many, e. g., in the production of α-aminoacids. See Sidgwick, "Organic Chemistry of Nitrogen" page 115, Claredon Press (1937). The polyfunctional nature of these compounds render them versatile intermediates in organic synthesis. The present invention provides a novel and useful process for the production of these compounds.

The following preparations and examples are illustrative of the process and products of the present invention, but are not to be construed as limiting.

*Preparation 1.—Phenylglyoxal diethylacetal*

To a solution of phenyl magnesium bromide, prepared by the reaction of 196.25 grams of bromobenzene with 30.5 grams of magnesium turnings in 650 milliliters of anhydrous ether, was added, at zero degrees centigrade, 107.5 grams of diethoxyacetylpiperidine [see Wöhl and Lange, Ber., 41, 3615 (1908)]. The addition was conducted with stirring over a period of about eight minutes. Solid soon began to precipitate during the addition making stirring difficult. Stirring of the refluxed mixture was continued for eighteen hours. The reaction mixture was then decomposed by the gradual addition of 500 milliliters of a twenty percent aqueous solution of ammonium chloride. The ether layer was separated and the aqueous layer mixed with additional ammonium chloride solution. The aqueous layer was thoroughly extracted with two 1,500-milliliter portions of ether which were then combined with the separated ether layer. The combined ether solutions were dried with anhydrous magnesium sulfate and the ether removed by distillation. The residue was then distilled through a seven inch column packed with glass helices to give 58.75 grams, a yield of 56 percent of the theoretical, of phenylglyoxal diethylacetal boiling at 147.5 to 150 degrees centigrade at 2.2 millimeters of mercury pressure, and having a $N_D^{25}$ of 1.4992. [See Torrey et al., J. Org. Chem., 6, 289 (1941).]

*Preparation 2.—Tertiary butylglyoxal diethylacetal*

To tertiary butyl magnesium chloride (prepared according to Organic Syntheses, Coll. vol. I, 254 (1941) using 61 grams (2.5 moles) of magnesium), was added, at five degrees centigrade with stirring over a period of about five minutes, 215 grams (one mole) of diethoxyacetylpiperidine. The mixture was stirred and refluxed for twenty hours. The mixture was decomposed by the addition of 300 milliliters of ice-cold aqueous ammonium chloride solution. The ether layer was separated, the aqueous slurry thoroughly extracted with ether and the combined ether solutions dried over anhydrous magnesium sulfate. The ether was distilled and the residue distilled through a seven inch column packed with glass helices. There was thus obtained 152.2 grams, a yield of 82 percent of the theoretical, of tertiary butylglyoxal diethylacetal boiling at 80.5 to 82 degrees centigrade at fifteen millimeters of mercury pressure and having a $N_D^{25}$ of 1.4128 and the analysis below.

*Analysis.*—Calculated for $C_{10}H_{20}O_3$: C, 63.79; H, 10.71. Found: C, 64.07; H, 10.99.

Similarly, the cyclic acetals of these and other α-ketoaldehydes are prepared by the reaction of the selected Grignard reagent with the ethylene glycol acetal or other alkane-α-diol or alkane-β-diol acetal of piperidine-1-glyoxal, which in turn can be prepared in the manner of Wöhl and Lange (loc. cit.) employing the appropriate starting materials.

*Example 1.—Ethyl pyruvate*

In a reaction flask protected from moisture and fitted with a condenser was added 57.5 grams (0.394 mole) of freshly distilled methylglyoxal diethylacetal, 70.2 grams (0.394 mole) of N-bromo-succinimide and 288 milliliters of carbon tetrachloride. The mixture was heated by a 250 watt drying lamp placed about one foot below the reaction flask. As soon as the mixture began to reflux, the light was turned off as the extremely vigorous reaction commenced. When the initial reaction had subsided, the lamp was turned on again and the temperature thus maintained so as to achieve gentle refluxing for three hours. The light was then turned off and the mixture maintained at about 25 degrees centigrade for about sixteen hours. The precipitated succinimide was separated by filtration and washed with carbon tetrachloride. The solvent was removed from the filtrate by distillation through a glass helice-packed seven inch column. The residue was distilled through the same column to give 36.3 grams, a yield of 78 percent of the theoretical, of ethyl pyruvate distilling at 48 to 52 degrees centigrade at fourteen millimeters of mercury pressure.

The distillate thus obtained was further purified by dissolving in ether and washing the solution with a one percent aqueous solution of sodium bicarbonate, drying the washed ether solution and redistilling in the manner described above.

*Example 2.—n-Butyl pyruvate*

Following the procedure described above, 79.5 grams (0.394 mole) of methylglyoxal di-n-butylacetal was reacted with an equimolar amount of N-bromosuccinimide to give 40.8 grams, a yield of 72 percent of the theoretical, of n-butyl pyruvate distilling at 74 to 77 degrees centigrade at a pressure of fifteen millimeters of mercury and having an $N_D^{25}$ of 1.4132 and the analysis below.

*Analysis.*—Calculated for $C_7H_{12}O_3$: C, 58.31; H, 8.39. Found: C, 58.77; H, 8.58.

*Example 3.—Ethyl trimethylpyruvate*

Following the procedure described in Example 1, 74.1 grams (0.394 mole) of tertiary butylglyoxal diethylacetal was reacted with an equimolar amount of N-bromosuccinimide for 5.5 hours to give 48.4 grams, a yield of 78 percent of the theoretical, of ethyl trimethylpyruvate distilling at 65 to 66 degrees centigrade at fifteen millimeters of mercury pressure, having an $N_D^{20}$ of 1.4096, a $D^{20}$ of 0.9578, an $M_D$ (calc.) of 40.82, an $M_D$ (found) of 40.83 and the analysis below.

*Analysis.*—Calculated for $C_8H_{14}O_3$: C, 60.74; H, 8.92. Found: C, 60.82; H, 9.21.

*Example 4.—Ethyl benzoylformate*

Following the procedure described in Example 1, a mixture of 38.13 grams (0.183 mole) of phenylglyoxal diethylacetal, 49.8 grams (0.280 mole) of N-bromosuccinimide and 136 milliliters of carbon tetrachloride were refluxed for eighteen hours. There was thus obtained 23.9 grams, a yield of 73 percent of the theoretical, of ethyl benzoylformate distilling at 97 degrees centigrade at two millimeters of mercury pressure. This material was dissolved in ether, the solution washed with a one percent solution of sodium bicarbonate and the ether and residue redistilled. The redistilled ethyl benzoylformate had a $N_D^{25}$ of 1.5145 and the analysis below.

*Analysis.*—Calculated for $C_{10}H_{10}O_3$: C, 67.40; H, 5.66. Found: C, 67.73; H, 5.85.

Following the procedure described in Example 1, other aldehydric acetals of α-ketoaldehydes are converted to α-ketocarboxylic acid esters. For example, 1-ethylenedioxy-2-oxo-butane, -pentane, -hexane, -heptane, -octane and -dodecane are converted by reaction with N-bromoacetamide to β-bromoethyl α-ketobutyrate, β-bromoethyl α-ketovalerate, β-bromoethyl α-ketocaproate, β-bromoethyl α-ketoenanthate, β-bromoethyl α-ketocaprylate, and β-bromoethyl α-ketododecate, respectively. Substituting N-chlorosuccinimide in the reactions thus described produces the corresponding β-chloroethyl esters. Substituting the corresponding dialkyl acetals of the α-ketoaldehydes named above, e. g., 1,1-dimethoxy-2-oxo-butane, -pentane, -hexane, -heptane, -octane and -dodecane, and 1,1-diethoxy-2-oxo-butane, -pentane, -hexane, -heptane, -octane and -dodecane, and other dialkyloxy-2-oxo-lower-aliphatic hydrocarbons, there is produced, respectively, in the reaction with N-bromosuccinimide, methyl α-ketobutyrate, α-ketovalerate, α-ketocaproate, α-ketoenanthate, α-ketocaprylate, α-ketododecate, and ethyl α-ketobutyrate, α-ketovalerate, α-ketocaproate, α-ketoenanthate, α-ketocaprylate, α-ketododecate, and other alkyl α-keto-lower-fatty acid esters.

Other aldehydic acetals of α-ketoaldehydes which are converted to α-ketoacid esters by the action of, for example, N-bromoacetamide or N-bromosuccinimide according to the process of the present invention include 2-(diethoxyacetyl)pyridine which is converted to ethyl pyridylglyoxalate, 2-(diethoxyacetyl)thiophene which is converted to ethyl thiophylglyoxalate, 3-(diethoxyacetyl)-pyran which is converted to ethyl pyranylglyoxalate, 2-(diethoxyacetyl)furan which is converted to ethyl furylglyoxalate, cyclohexylglyoxal α-diethylacetal which is converted to ethyl cyclohexylglyoxalate, cyclopentylglyoxal α-diethylacetal which is converted to ethyl cyclopentylglyoxalate, 2-bromophenylglyoxal α-diethylacetal which is converted to ethyl 2-bromophenylglyoxalate, benzylglyoxal α-diethylacetal which is converted to ethyl phenylpyruvate, etc.

It is to be understood that the invention is no to be limited to the exact details of operation or exact compounds shown and described, as obvious modifications and equivalents will be apparent to one skilled in the art, and the invention is therefore to be limited only by the scope of the appended claims.

I claim:

1. A process for the production of an α-ketocarboxylic acid ester which comprises reacting an aldehydic acetal of an α-ketoaldehyde with a halogenating agent selected from the group consisting of N-haloamides and N-haloimides wherein the halo group is a halogen having an atomic weight from 35 to 80, inclusive, to produce an α-ketocarboxylic acid ester.

2. A process for the production of an α-ketocarboxylic acid alkyl ester which comprises reacting a 1,1-dialkoxy-2-ketone with a halogenating agent selected from the group consisting of N-haloamides and N-haloimides wherein the halo group is a halogen having an atomic weight from 35 to 80, inclusive, to produce an α-ketocarboxylic acid alkyl ester.

3. The process of claim 2 wherein the reaction is catalyzed by light.

4. The process of claim 2 wherein the halogenating agent is N-bromosuccinimide.

5. The process of claim 2 wherein the halogenating agent is N-bromoacetamide.

6. The process of claim 2 wherein the starting ketone is a 1,1-di-lower-alkoxy-2-ketone.

7. The process of claim 2 wherein the starting ketone is selected from the group consisting of 1,1-dimethoxy-2-ketones and 1,1-di-ethoxy-2-ketones.

8. A process for the production of an α-ketocarboxylic acid ethyl ester which comprises reacting a 1,1-diethoxy-2-ketone which, other than the —CO—CH(—O—$C_2H_5$)$_2$ group, is hydrocarbon, with N-bromosuccinimide, to produce an α-ketocarboxylic acid ethyl ester.

9. The process of claim 8 wherein the reaction is catalyzed by light.

No references cited.